United States Patent
Garcia et al.

(10) Patent No.: US 7,129,465 B2
(45) Date of Patent: Oct. 31, 2006

(54) ELECTRONICALLY CODE-MULTIPLEXED READOUT OF PHOTO-DETECTOR ARRAYS

(75) Inventors: Jorge Andres Garcia, Newark, DE (US); Fouad Eskender Kiamilev, Hockessin, DE (US); William Beynon Lawler, Edgewater, MD (US); William Charles Ruff, Catonsville, MD (US); Barry Lee Stann, Edgewater, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/104,918

(22) Filed: Apr. 13, 2005

(65) Prior Publication Data

US 2005/0242272 A1 Nov. 3, 2005

Related U.S. Application Data

(60) Provisional application No. 60/561,793, filed on Apr. 13, 2004.

(51) Int. Cl.
*H01J 40/14* (2006.01)

(52) U.S. Cl. .............................. 250/214 R; 250/214 A
(58) Field of Classification Search ............ 250/214 R, 250/214 LA, 214 A; 327/514, 515
See application file for complete search history.

(56) References Cited

U.S. PATENT DOCUMENTS 4,890,070 A * 12/1989 Benahim et al. ............. 330/296
4,953,155 A * 8/1990 Tangonan et al. .............. 398/55

* cited by examiner

*Primary Examiner*—Kevin Pyo
(74) *Attorney, Agent, or Firm*—Stephen Bloor; Guy M. Miller

(57) ABSTRACT

Methods and apparatus for generating a code-multiplexed readout value of photocurrents for a photo-detector array of cells are disclosed. Readout values are determined using a multiplexer and current amplifier for each cell and a current-to-voltage converter for each row of cells. The multiplexer multiplexes a photocurrent in an electrical domain for a respective cell using a code and generates electric currents responsive to the photocurrent. The current amplifier amplifies the electric currents. The current-to-voltage converter for each row generates the readout value for that row of the array responsive to the amplified electric currents.

2 Claims, 5 Drawing Sheets

ELECTRONICALLY CODE-MULTIPLEXED READOUT OF PHOTO-DETECTOR ARRAYS

FIELD OF THE INVENTION

The present invention relates to the field of radar and, more particularly, to code-multiplexed readout of photo-detector arrays.

BACKGROUND OF THE INVENTION

The design of readout circuits for photo-detector array imaging systems is increasingly challenging due to larger format photo-detector arrays with smaller pixels, coupled with requirements for higher sensitivity and lower power dissipation. Traditional readout techniques involve photo-current-to-voltage conversion at a pixel readout cell level using an integrating capacitor. Once the signals have been converted to voltage, time-multiplexing circuitry is used to transfer the discrete-time voltages to a single serial output. With smaller pixels, the size of the integration capacitor per readout cell is limited, thereby adversely affecting sampling noise. Additionally, larger format arrays require that the electronics multiplexing the discrete-time readout cell voltages operate at faster speeds for a given frame rate. For active imaging systems with moderately large photo-detector arrays, the bandwidth requirements may become prohibitive.

U.S. Pat. No. 6,618,125 to Stann entitled "Code-Multi-plexed Read-out for Ladar Systems" (herein Stann), which is incorporated fully herein by reference, describes a readout scheme based on orthogonal modulation of photo-detector signals. In Stann, photocurrents are modulated with orthogonal carriers in the optical domain. Modulating photocurrents with the orthogonal carriers enables signals from an entire row to be read simultaneously, thereby improving the circuit bandwidth in comparison to conventional time-multiplexing schemes. The orthogonal modulation of photocurrents in the optical domain, however, is difficult and subject to losses in optical power. In addition, systems of this type still involve photocurrent-to-voltage conversion at the pixel readout cell level and, thus, have many of the same limitations at time-multiplexing schemes.

There is an ever present need for improved readout methods and apparatus for use with photo-detector arrays that are not subject to the above limitations. The present invention addresses this need among others.

SUMMARY OF THE INVENTION

The present invention is embodied in methods and apparatus for generating a code-multiplexed readout value for photocurrents of a photo-detector array of cells. Readout values are determined using an encoding modulator and current amplifier for each cell and a current-to-voltage converter for each row of cells. The encoding modulator multiplies or encodes a photocurrent in an electrical domain for a respective cell using a code and generates uniquely coded electric currents responsive to the photocurrent. Each cell in the row is coded with a unique code different from the other codes in the row. The current amplifier amplifies the electric currents generated by the encoding modulator. The uniquely coded electric current outputs from the amplifier in each cell are summed on a single wire for each row. The current-to-voltage converter for each row generates the readout value for that row of the array responsive to the amplified electric currents.

BRIEF DESCRIPTION OF THE DRAWINGS

The invention is best understood from the following detailed description when read in connection with the accompanying drawings, with like elements having the same reference numerals. Included in the drawings is the following figure:

FIG. 2A is a block diagram of a photo-detector readout cell for use in the read out array of FIG. 2;

DETAILED DESCRIPTION OF THE INVENTION

The invention will also be better understood with reference to the attached Appendix A entitled "0.5 μm-CMOS Orthogonal Encoding Readout Cell for Active Imaging Systems."

Figure 1:
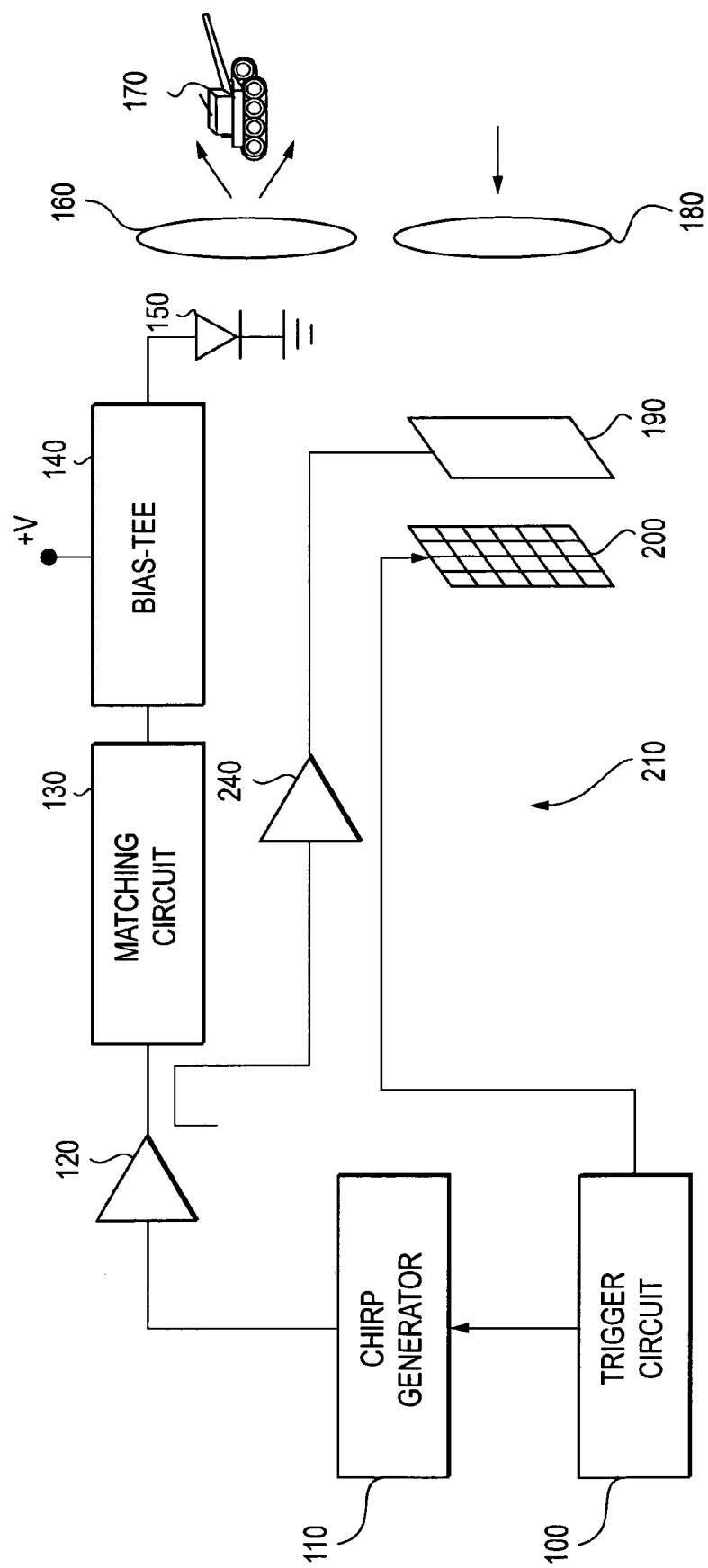
FIG. 1 is a block diagram of a laser detection and ranging system in which the present invention may be incorporated.

FIG. 1 depicts an electronic block diagram of a laser detection and ranging (ladar) system architecture. In FIG. 1, a trigger circuit 100 initiates the generation of a saw tooth chirp signal by chirp generator 110 that serves as the laser modulation and local oscillator signal. The chirp signal is a sinusoidal waveform whose frequency linearly increases over its period, T. Other modulation waveforms may also be used.

In FIG. 1, the chirp signal is fed into a wideband RF power amplifier 120 that modulates the current driving semiconductor laser diode 150. A wideband matching circuit 130 between the wideband RF power amplifier 120 and a semiconductor laser diode 150 matches the driving impedance of the wideband RF power amplifier to the semiconductor laser diode 150 over the modulation bandwidth. Matching the driving impedance of the amplifier causes the light beam intensity to be highly amplitude modulated (AM) and causes the peak intensity to be constant as a function of chirp frequency. Output from the wideband matching circuit 130 and a DC current (+V) are summed In a bias tee 140 to provide the current drive for the semiconductor laser diode 150 with a bandwidth at least equal to the chirp waveform.

The divergent laser beam from the semiconductor laser 150 is collected by a lens 160, which collimates the light into a beam sufficiently wide to encompass or floodlight a target scene of interest 170. A small portion of the laser light is reflected from the target 170 back toward the ladar and collected by a lens 180. A photo detector array 190 is driven by the original laser modulation waveform by tapping off a portion of the output of the wideband RF power amplifier 120 and amplifying the signal through an amplifier 240. The photo detector array 190 is located in the light path somewhere between the lens 180 and an array of readout cells 200 in accordance with the present invention.

The photo detector array 190 modulates (mixes) the received light from the target with the original chirp signal and then resultant photo-current signals are passed onto the array of readout cells 200 for detection in accordance with the present invention, which is described in further detail below. Each photo-detector element in the photo-detector array 190 converts incident light power into an electric current and its corresponding readout cell processes the current.

Figure 2:
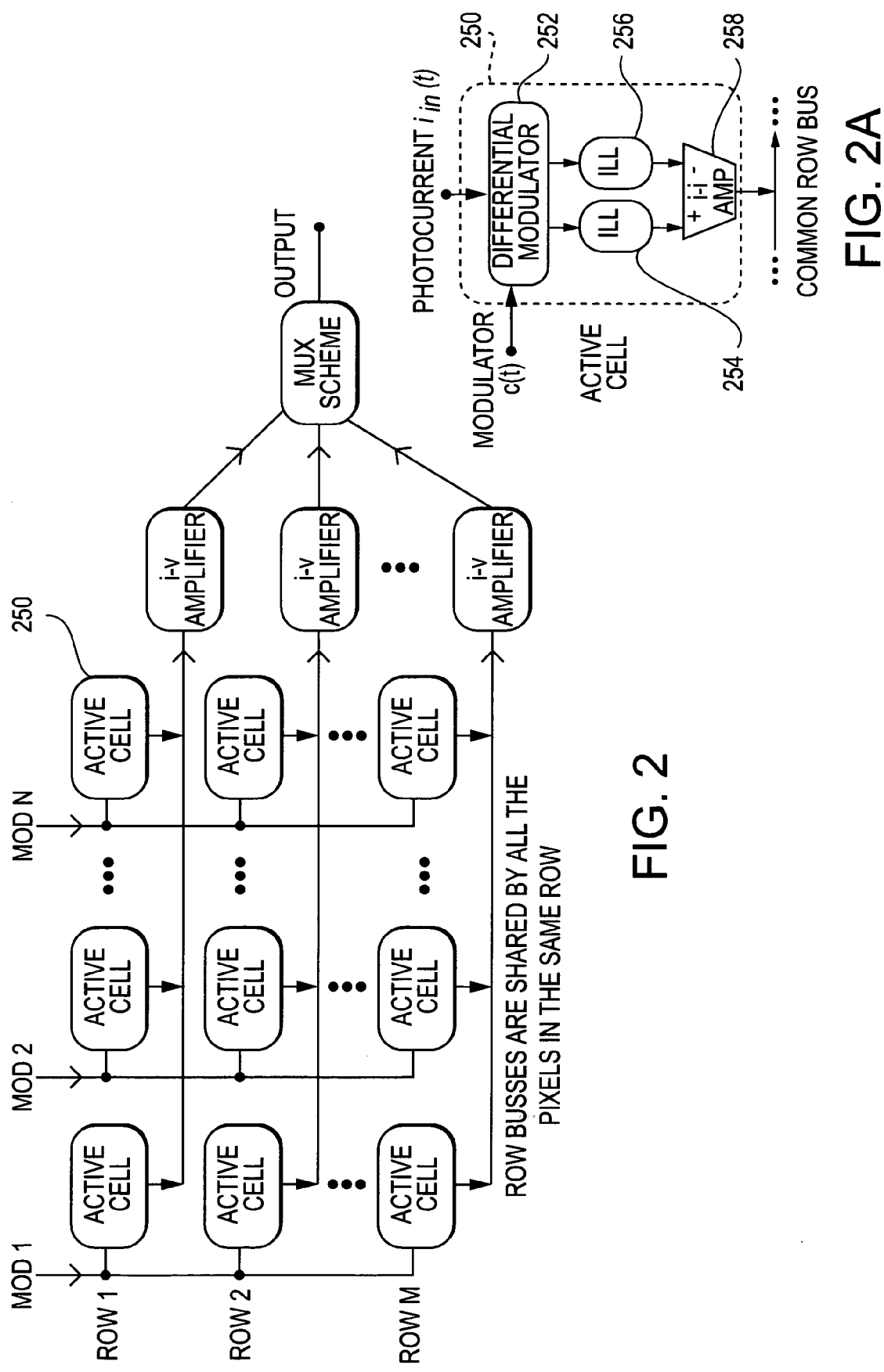
FIG. 2 is a block diagram of a read out architecture in accordance with the present invention.

FIG. 2 depicts an exemplary architecture for an array of readout cells 200 including a plurality readout cells (represented by readout cell 250) in accordance with the present Invention. In the electrical domain, the continuous-time currents from the photo-detectors of the photo-detector array 200 are modulated by orthogonal encoded signals in a column-wise manner in the plurality of readout cells to form encoded current readout values for the cells, and then added in the per-row common busses to form summed encoded current readout values for the row. Next, the added encoded current signals are driven to an array of current-to-voltage converters (one per row) that provide conversion from current to voltage and additional voltage gain to form voltage readout values for the row. The encoded information from each photo-detector is present in the composite voltage signal for each common row. The amplified signals are then fed to a multiplexer block to generate a single data stream output signal.

In an exemplary embodiment, the architecture for the array of readout cells employs code division multiple access (CDMA) using pseudo-random (pn) sequences as the code for the cell modulators. While pn-sequences are not perfectly orthogonal, they are well understood and relatively simple to generate. In addition, pn-sequences can be designed to meet a specific error criterion determined by the overall system noise constraints in a manner that will be understood by those of skill in the art.

FIG. 2A depicts an exemplary topology of a readout cell 250 in accordance with the present invention. The illustrated readout cell 250 includes a differential encoding modulator 252, a pair of current locked loops (ILL) 254, 256, and a differential current amplifier 258. The pair of current locked loops 254, 256 and the differential current amplifier 258 together form a current amplifier. The readout cell 250 efficiently encodes an incoming photocurrent signal, while adding low electronic noise and providing high injection efficiency. In an exemplary embodiment, the readout cell 250 which is coupled to a "self-mixing" metal-semiconductor-metal (MSM) detector 190.

In an exemplary embodiment, the differential modulator 252 includes a cross-coupled array of CMOS switches that multiply the incoming photocurrent by encoding the modulating signal. The ILLs 254, 256 coupled to the differential modulator 252 ensure near-zero MSM detector bias and virtual ground regulation while coupling the impedance of the photo-detector element 190 to the next module. The differential current amplifier 258 provide current gain and high output impedance to couple the single-ended output of the cell to the common row bus.

Figure 3:
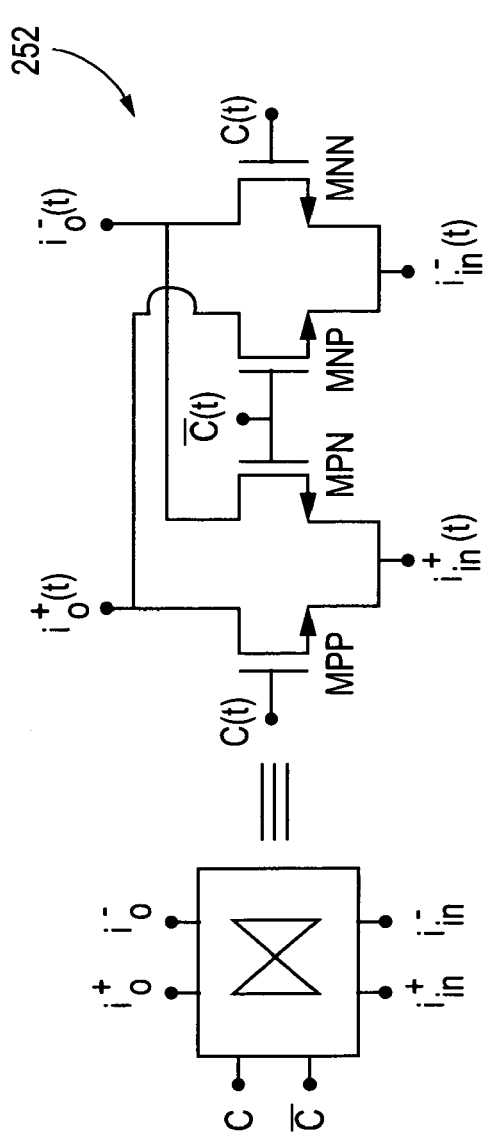
FIG. 3 is circuit diagram of an encoding modulator for use in the photo-detector readout cell of FIG. 2A.

FIG. 3 depicts an exemplary differential encoding modulator 252. The differential encoding modulator 252 depicted in FIG. 3 has been used as an analog multiplier and as square wave modulator in high frequency, low noise chopper amplifiers. The differential modulator 252 in the present invention (i) modulates the photocurrent input with a signal from an orthogonal set and (ii) spreads the photo-detector signal spectrum before amplification occurs to improve the signal to noise ratio of the overall cell.

In an exemplary embodiment, transistor and threshold voltage mismatches in the differential modulator 252 are minimized so that the differential nature of the differential modulator 252 causes equal charge injection from the modulating signal into both arms of the output. Assuming low photocurrent amplitude at the circuit input, the modulator's injection noise can be treated as signal independent. The circuit's complementary structure then ensures that the charge injection produced by the switching of MPP and MNP on $i_o^+(t)$ is replicated over $i_o^-(t)$ by the switching of MNN and MPN. The Injected signal in the modulating process becomes common-mode noise that can be cancelled in the succeeding differential to single-ended current amplifier. Under signal-independent charge injection and negligible transistor mismatch conditions, the differential modulator makes the injected charge appear as common-mode noise, and the differential to single-ended operation carried out by the differential current amplifier 258 cancels the switching noise.

Figure 4:
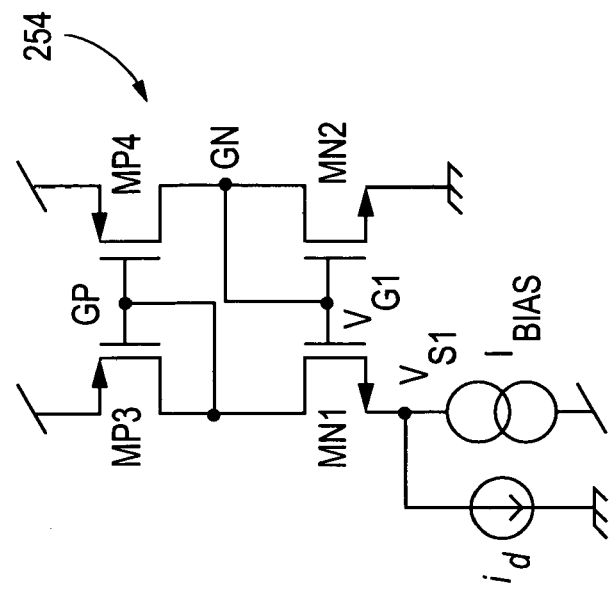
FIG. 4 is a circuit diagram of a current locked loop for use in the photo-detector readout cell of FIG. 2A.

FIG. 4 depicts an exemplary ILL (e.g., ILL 254). The exemplary ILL 254 collects photo-detector currents from passive infrared (IR) sensors, for example. The exemplary ILL 254 exhibits high injection efficiency, near-zero detector bias, because of its virtual ground input characteristic and low static power consumption.

Photo-detector readout circuits typically require a very low input impedance to maximize injection efficiency. The ILL 254 achieves low input impedance through negative feedback around transistor MN1.

Figure 5:
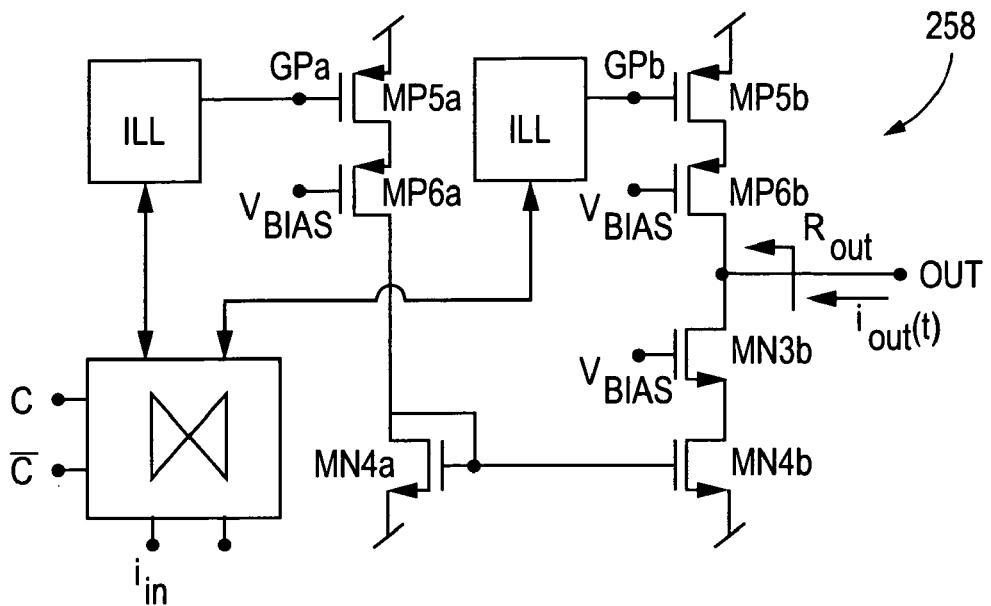
FIG. 5 is a differential amplifier for use in the photo-detector readout cell of FIG. 2A.

FIG. 5 depicts an exemplary differential current amplifier 258. In the exemplary differential current amplifier depicted in FIG. 6, current mirrors MP5a and MP5b amplify the outputs from each ILL circuit 254, 256. To perform differential to single-ended conversion, one of the branches is passed through the current mirror MN4a, MN4b–MN3b and then subtracted from the other. The resulting single-ended signal corresponds to an amplified version of the modulated photocurrent. Transistor MN3b is used to minimize channel-length modulation on MN4b and to improve its output impedance. Transistors MP6a and MP6b are used to minimize channel-length modulation effects on the mirror transistors MP5a, MP5b and to further boost the output Impedance of the amplifier. The low frequency output impedance $R_{out}$ of the circuit is the parallel of the NMOS and PMOS cascade output impedances.

Figure 6:
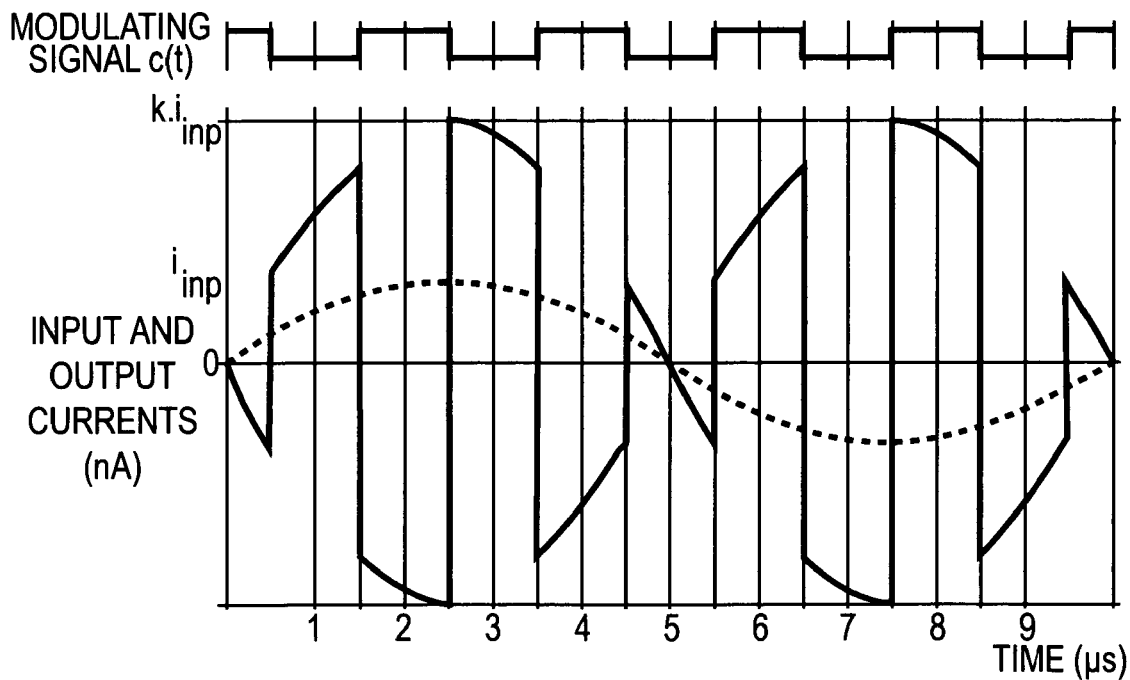
FIG. 6 is a graph depicting a qualitative representation of the photocurrent coded modulation process with a square wave code applied.
Figure 7:
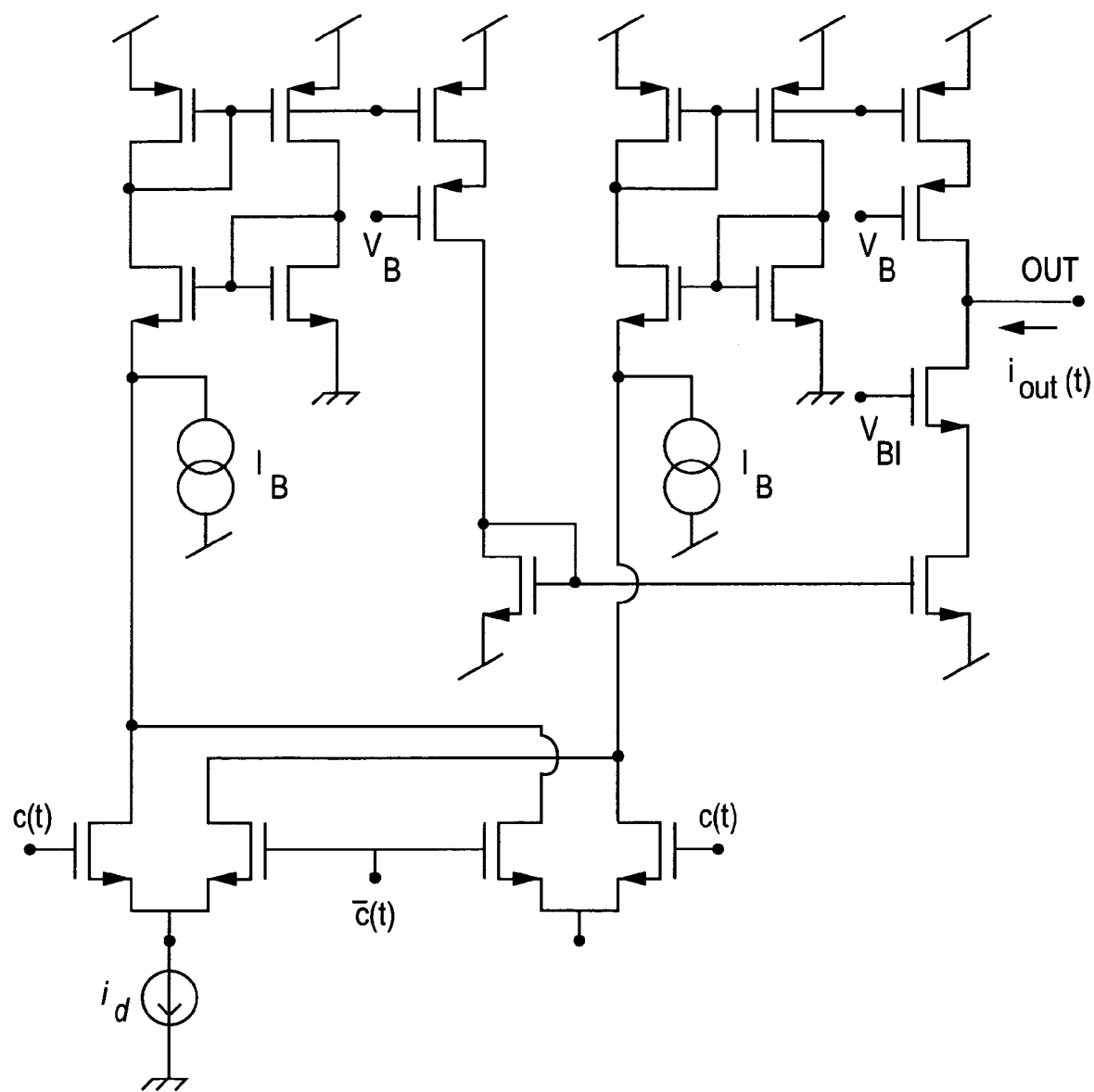
FIG. 7 is a simplified schematic of the photo-detector readout cell of FIG. 2A.

FIG. 6 depicts a qualitative representation of an encoded modulated output current. The input is a sinusoidal current signal with peak amplitude $i_{imp}$ and the modulating signal c(t) is simply the square waveform shown on top. FIG. 7 depicts a simplified schematic of the readout cell 250.

Although the invention has been described for use with active imaging systems, it is contemplated that it may be applied to passive imaging systems, particularly systems such as longwave (8–12 μm) infrared imagers where there is a very large background flux. In longwave TDMA readout circuits, the high background flux may saturate the in-pixel integration capacitor(s), which can not be made large due to area constraints. In a passive encoding readout scheme the integration capacitors would be located at the end of each row, where more chip area is available. Another promising application for the encoding technique is high-speed passive imaging, particularly for applications that do not require extremely high amplitude resolution.

Further, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A readout cell for generating a code-multiplexed readout value for a photocurrent generated by a photo-detector of a photo-detector array comprising:
   a differential encoding modulator that modulates and encodes the photocurrent in an electrical domain using a code, the differential encoding modulator generating an electric current responsive to the photocurrent;
   a current amplifier coupled to the differential encoding modulator, the current amplifier differentially amplifying the electric current to form a readout value for the readout cell and for outputting the readout value to a common row bus with other outputting readout cells forming a composite current signal on said common row bus.

2. An apparatus for generating a code-multiplexed readout value for photocurrents of a photo-detector array of cells, the apparatus comprising:
   a differential encoding modulator for each readout cell that modulates and encodes the photocurrent in an electrical domain for a respective cell using a code, the differential encoding modulators generating electrical currents responsive to the photocurrents;
   a current amplifier for each readout cell coupled to the respective differential encoding modulator, the current amplifier differentially amplifying the electric currents to form a readout value for the readout cell and for outputting the readout value to a common row bus with other outputting readout cells forming a composite current signal on said common row bus; and
   a current-to-voltage converter for each row of cells coupled to the current amplifiers within a respective row, the current-to-voltage converter generating the readout value for each row of the photo-detector array responsive to the amplified electric currents.

* * * * *